United States Patent

Kulpinski

Patent Number: 5,627,381
Date of Patent: May 6, 1997

[54] OPTIMIZED STORAGE PHOSPHOR ERASE TIME

[75] Inventor: Robert W. Kulpinski, Penfield, N.Y.

[73] Assignee: Eastman Kodak Company, Rochester, N.Y.

[21] Appl. No.: 620,433

[22] Filed: Mar. 22, 1996

[51] Int. Cl.$^6$ ................................................ G03B 42/02
[52] U.S. Cl. ........................................................ 250/588
[58] Field of Search ............................................. 250/588

[56] References Cited

U.S. PATENT DOCUMENTS

| | | |
|---|---|---|
| Re. 31,847 | 3/1985 | Luckey . |
| 4,584,482 | 4/1986 | Suzuki et al. . |
| 4,687,937 | 8/1987 | Aagano et al. . |
| 4,873,441 | 10/1989 | Kimura et al. . |
| 4,900,927 | 2/1990 | Kimura et al. . |
| 4,952,806 | 8/1990 | Mori . |
| 5,072,119 | 12/1991 | Yamaguchi . |

FOREIGN PATENT DOCUMENTS 5-119414  5/1993  Japan ............................... 250/588

Primary Examiner—Edward J. Glick
Attorney, Agent, or Firm—William F. Noval

[57] ABSTRACT

A storage phosphor imaging system includes a scanner for scanning a storage phosphor storing an x-ray image to produce an x-ray light image, a converter for converting the x-ray light image into a digital x-ray image signal having a range of code values, and a storage phosphor erase light assembly for erasing the storage phosphor of substantially all residual image. Apparatus for controlling the erase light assembly includes a digital image processor for determining the maximum code value of a digital x-ray image signal which is produced from an x-ray image stored in a storage phosphor to be erased; and a controller for controlling the time of actuation of the erase light assembly as a function of the determined maximum code value.

3 Claims, 5 Drawing Sheets

FIG. 7

| PROJECTION | PATIENT THICKNESS (CM) | GRID | SID (cm) | ESE 200 SPEED (mR) | APPROX. PLATE EXP. (mR) |
|---|---|---|---|---|---|
| A/P ABDOMEN | 23 | YES | 100 | 490 | 60-145 |
| A/P LUMBAR SPINE | 23 | YES | 100 | 450 | 50-135 |
| A/P FULL SPINE | 23 | YES | 183 | 260 | 40-100 |
| A/P CERVICAL SPINE | 13 | YES | 100 | 135 | 20-52 |
| LATERAL SKULL | 15 | YES | 100 | 145 | 20-52 |
| P/A CHEST | 23 | NO | 183 | 15 | 12 |
| P/A CHEST | 23 | YES | 183 | 25 | 10-20 |

OPTIMIZED STORAGE PHOSPHOR ERASE TIME

FIELD OF THE INVENTION

This invention relates in general to storage phosphor systems in which a latent x-ray image is recorded in a storage phosphor, the storage phosphor is read to convert the latent x-ray image into an x-ray image signal, and after conversion, the storage phosphor is erased and reused. More specifically, this invention relates to the optimization of the storage phosphor erase time.

BACKGROUND OF THE INVENTION

In a storage phosphor imaging system as described in U.S. Pat. Re. No. 31,847, reissued Mar. 12, 1985, inventor Luckey, a storage phosphor is exposed to an x-ray image of an object, such as the body part of a patient, to record a latent x-ray image in the storage phosphor. The latent x-ray image is read out by scanning the storage phosphor in a raster pattern with relatively long wavelength stimulating radiation (such as red or infrared light produced by a gas or diode laser). Upon stimulation, the storage phosphor releases emitted radiation of an intermediate wavelength, such as blue light, in proportion to the quantity of x-rays received. The emitted radiation from the storage phosphor is reflected by a mirror light collector and detected by a photodetector which can include one or more photomultiplier tubes, to produce an x-ray image signal. The x-ray image signal may then be processed for tone scale and edge enhancement.

In order to be able to reuse the storage phosphor, any residual image is erased by exposing the storage phosphor to an erase light source. Balanced with the need to erase all of the residual image from the storage phosphor is the desire to increase productivity of the storage phosphor reader. In a known storage phosphor reader, the erase time is fixed at between 10 to 30 seconds (depending on the storage phosphor size) which is adequate to reduce the latent image of a 200 mR x-ray exposure to a residual image of less than 0.01 mR (residual fraction of $<5\times10-5$). This residual image would then be undetectable in a subsequent exposure and scan. It is also known that a storage phosphor exposure of 200 mR is uncommon in diagnostic radiology. This amount of plate exposure translates into an entrance skin exposure of approximately 350 mR for average thickness body habitus at a typical x-ray source to image distance (SID). Also, in the case of grids used during exposure, a Bucky factor (i.e., the ratio of incident x-ray radiation to transmitted x-ray radiation passing through a lead grid) of 2–5 is common for the range of grid ratios and incident x-ray spectra used most typically in diagnostic radiography techniques. The Bucky factor, therefore, increases the potential entrance skin exposure to the range of 700–1500 mR for a 200 mR exposure incident on the storage phosphor.

Because of the potential biological hazards of ionizing radiation, such as diagnostic x-rays, an order of magnitude or less plate exposure is typically seen in diagnostic x-ray procedures. (See, e.g., the Common Entrance Skin Exposures for Various Radiographic Examinations, Table 1, FIG. 7). As shown in FIG. 7, the approximate plate exposure ranges from 10 to 145 mR. The approximate plate exposure is calculated from a scaling due to average patient thickness (scale factor=$(SOD/SID)^2$) and a scaling over a reasonable range of Bucky factors (2 to 5).

Since the time required to erase a storage phosphor is proportional to the x-ray exposure it receives, the machine cycle time is, unfortunately, maximized by fixing erase time to handle the worst case x-ray exposure scenario, and consequently the productivity of the reader is reduced. Erasing, for example, a 20 mR phosphor x-ray exposure requires substantially less time than 10 seconds for all plate sizes. Thus there is a need to increase productivity in storage phosphor readers. None of the erase techniques disclosed in the following patents entirely fulfill this need. U.S. Pat. No. 4,584,482, issued Apr. 22, 1986, inventors Suzuki and Horikawa; U.S. Pat. No. 4,687,937, issued Aug. 18, 1987, inventors Aagano and Takasaki; U.S. Pat. No. 4,873,441, issued Oct. 10, 1989, inventors Kimura and Watanabe; U.S. Pat. No. 4,900,927, issued Feb. 13, 1990, inventors Kimura and Watanabe; U.S. Pat. No. 4,952,806, issued Aug. 28, 1990, inventor Mori; U.S. Pat. No. 5,072,119, issued Dec. 10, 1991, inventor Yamagichi.

SUMMARY OF THE INVENTION

According to the present invention, there is provided a solution to the problems and needs discussed above.

According to a feature of the present invention there is provided in a storage phosphor imaging system including a scanner for scanning a storage phosphor storing an x-ray image to produce an x-ray light image, a converter for converting the x-ray light image into a digital x-ray image signal having a range of code values, and a storage phosphor erase light assembly for erasing said storage phosphor of substantially all residual image, apparatus for controlling said erase light assembly comprising;

a digital image processor for determining the maximum code value of a digital x-ray image signal which is produced from an x-ray image stored in a storage phosphor to be erased; and a controller for controlling the time of actuation of said erase light assembly as a function of said determined maximum code value.

The present invention has the following advantages among others.

1. The number of storage phosphor plates which can be processed in an hour is increased because of the reduction in erase time.

2. The erase times for typical clinical x-ray exposures is decreased while assuring full erasure of storage phosphors over the entire allowable design range.

DESCRIPTION OF THE DRAWINGS

FIG. 7 is a table listing common entrance skin exposures for various radiographic examinations.

DESCRIPTION OF THE EMBODIMENTS

Figure 5:
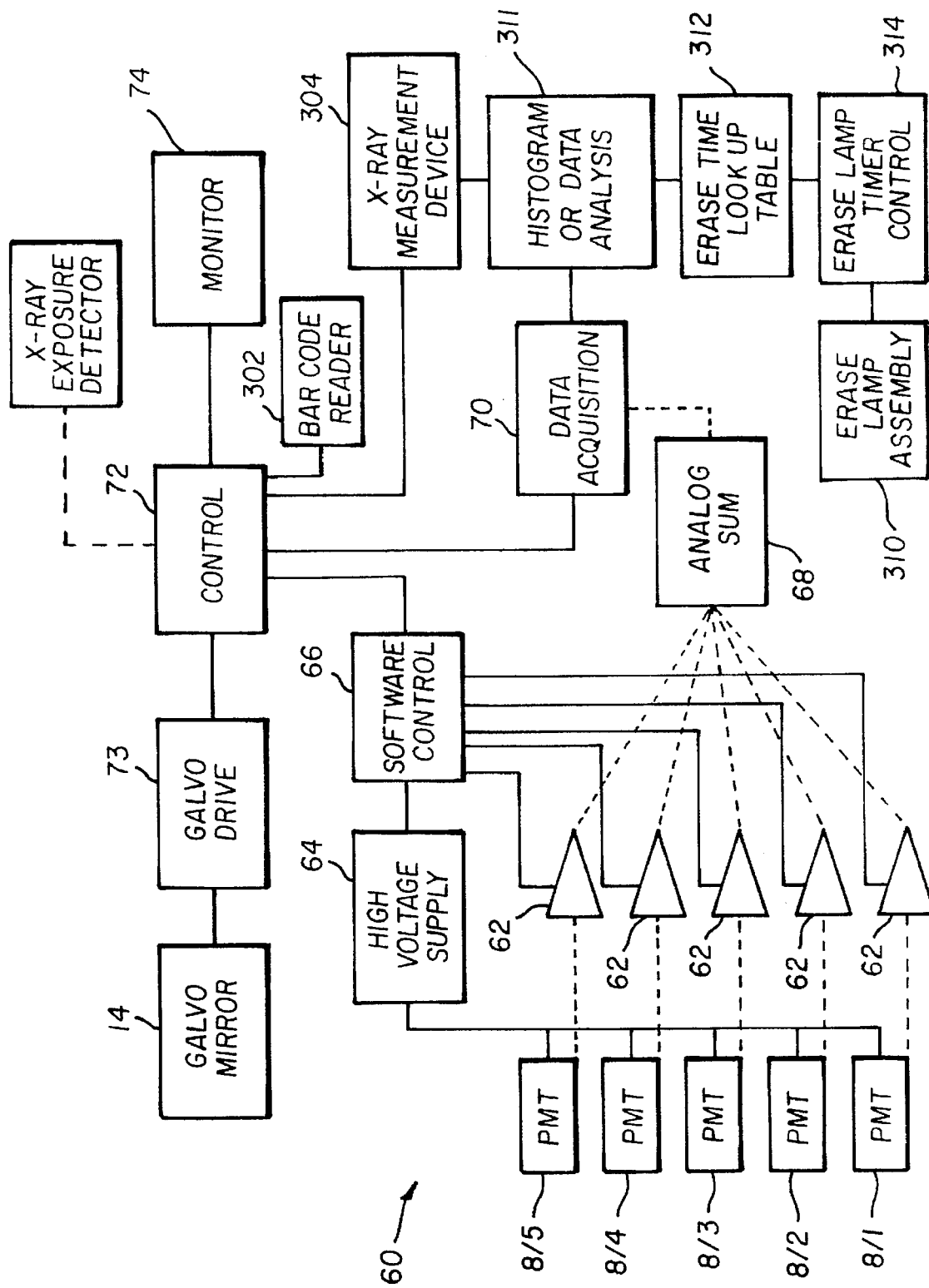
FIGS. 5 and 6 are respectively a block diagram and a perspective view of a storage phosphor reader incorporating the present invention.
Figure 6:
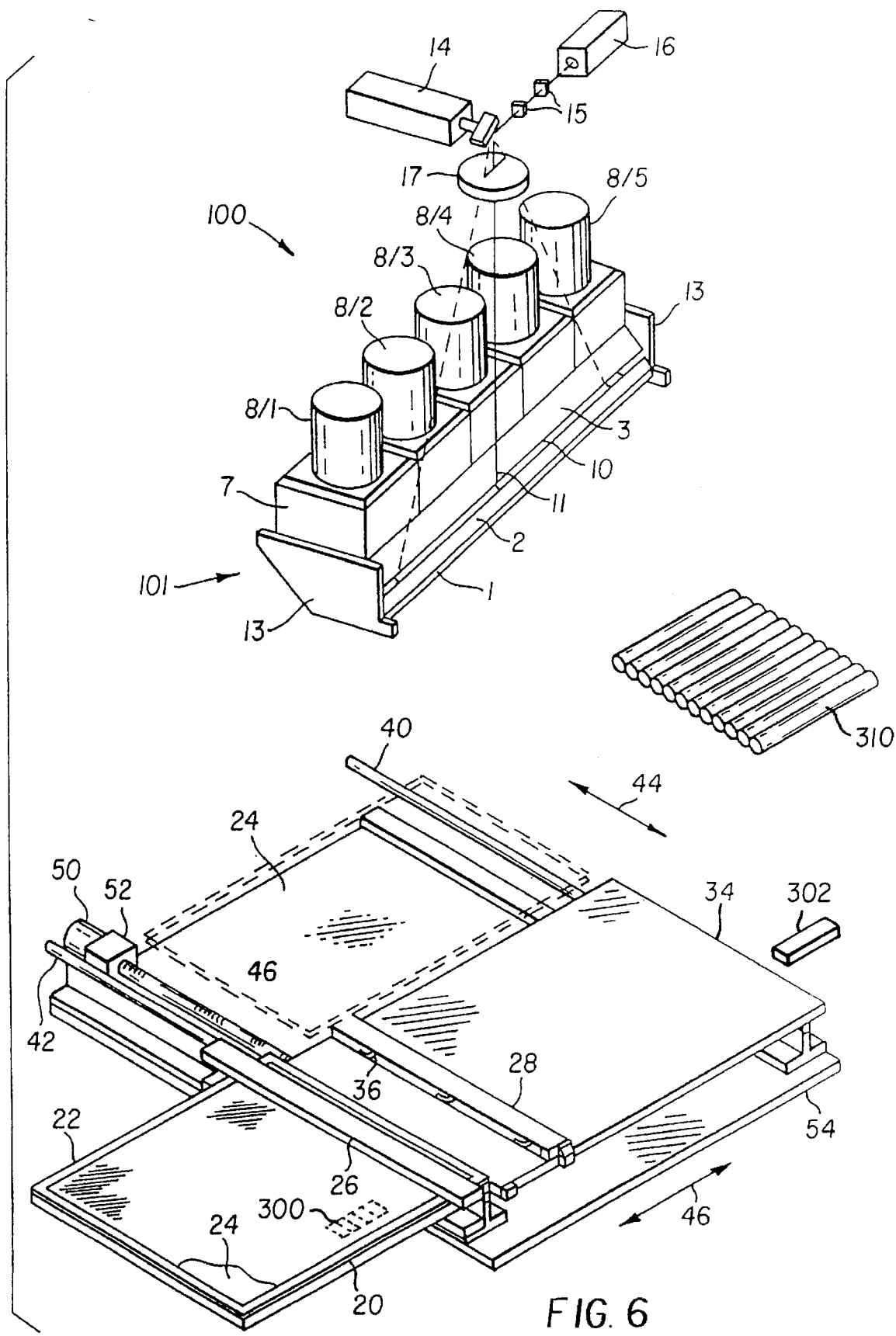

Referring now to FIGS. 5 and 6 there is shown the functional components of a storage phosphor reader incorporating the present invention. As shown, storage phosphor reader 100 includes a laser source 16, such as a gas or diode laser, which produces a laser beam which is shaped by beam shaping optics 15. The laser beam is then caused to be scanned in a fast or line direction by oscillating galvo mirror 14 onto storage phosphor plate 24, after the laser beam has passed through F-theta lens 17. The scanning laser beam then passes into the emitted light collector 101 through a slit 10 which is formed between specularly reflective mirrors 2 and 3, and immediately exits collector 101 through a second slit aligned with slit 10. The laser beam is brought to focus on the storage phosphor 24 causing emitted light to be created from a very small pixel area on the storage phosphor 24. The laser beam is scanned across storage phosphor 24 in a line scan direction as it is moved in a slow or page scan direction 44 perpendicular to the line scan direction.

The emitted light from storage phosphor 24 is directed either directly or indirectly through reflection from mirrors 1, 2, 3 of collector 101 to an array of five square photodetector photomultiplier tubes (PMTs) 8/1–8/5.

A storage phosphor cassette 22 containing storage phosphor plate 24 is loaded on cassette loading platform 20. The cassette is clamped in place by load lever 26. Storage phosphor plate 24 is extracted from cassette 22 by extraction device 28. Extraction device 28 is slidably mounted on translation stage 34 and includes hooks 36 which engage storage phosphor plate 24 to move it onto stage 34.

Translation stage 34 is slidably mounted on rails 40, 42 for movement in direction 44 (slow or page scan direction). Direction 44 is perpendicular to the directions 46 of loading and unloading plate 24. Stage 34 is driven by drive 50 mounted on block 52. Rails 40 and 42 are supported by frame member 54 of reader 100.

Plate 24 is provided with a bar code 300 which contains information such as cassette ID number, storage phosphor plate size, and storage phosphor plate speed or brightness. This bar code is read by bar code reader 302 when plate 24 is moved in direction 46. A bar code could also be located on the bottom or edge of plate 24 and read by a suitable bar code reader.

Once a storage phosphor plate 24 is on translation stage 34 a scan is begun. Translation stage 34 is moved in the direction of arrow 44 to the left and galvo 14 scans the laser beam repetitively in the line scan direction for the appropriate number of line scans as determined by the plate size. After scanning is completed stage 34 is reversed to bring plate 24 back to the starting position. Any residual image on plate 24 is then erased according to the invention by erase lamp assembly 310.

Referring to FIG. 5, there is shown operation and control 60 for reader 100. During the scan of storage phosphor plate 24, the emitted light is converted by PMTs 8/1–8/5 to electrical currents which are converted to voltages by preamplifiers 62. PMTs 8/1–8/5 are supplied high voltages by high voltage power supply 64 which, for example, can supply 0–1000 volts. The gain (e.g., 0–2 x) of preamplifiers 62 is controlled by control signals from software control 66. The voltage outputs from preamplifiers 62 are summed in sum circuit 68. The analog voltage signal from sum circuit 68 is converted to a digital signal by an analog to digital converter in data acquisition circuit 70. The digital signal is supplied to control 72. A touch screen monitor 74 displays the x-ray image signal from control circuit 72 and receives touch actuated control commands and data from an operator. Control 72 also controls the operation of galvo 14 through galvo drive circuit 72; receives input from bar code reader 302 and x-ray measurement device 304; and as will be explained, controls erase lamp assembly 310.

Figure 1:
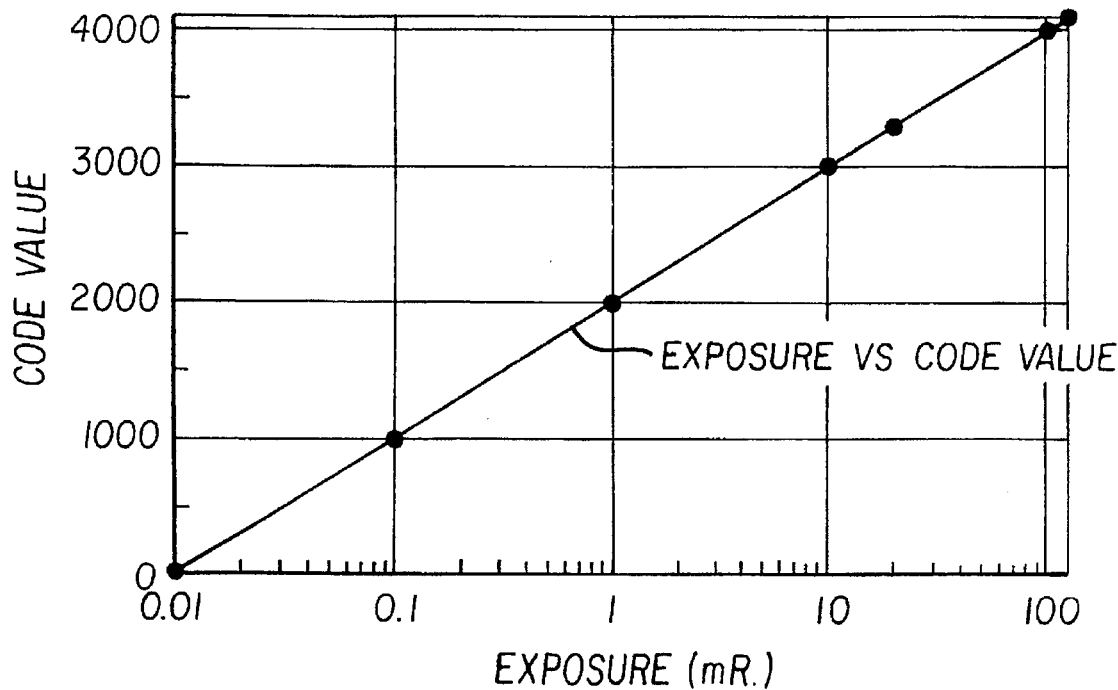
FIG. 1 is a graphical depiction of x-ray exposure vs. x-ray image signal code value.

The erase control technique of the present invention will now be described. There exists three key features of the reader 100 which allow for controlled erase of storage phosphor plate 24. First is the fact that the analog to digital system is linear in log space over a greater than 4 decade range. (0.01 mR to about 125 mR) of exposure. The actual exposure to the plate 24 can therefore be easily mapped from digital code value to x-ray exposure incident on or absorbed by storage phosphor plate 24 (FIG. 1).

The second key feature is the concept of patient exposure index number which needs the combined knowledge of the relative analog image signal gain, the relative plate 24 brightness, and the actual laser scanning parameters. While the patient exposure index number is not directly needed, these same three variables provide enough information to estimate the incident or absorbed x-ray exposure of a storage phosphor plate 24 depending on cassette/plate size or plate speed. The storage phosphor brightness or speed is measured at the time of manufacture and is encoded along with cassette/plate size on the cassette size/speed label on the rear side of the storage phosphor plate and/or on the bar code label for cassette 22. In addition, the reference plate brightness (i.e., the storage phosphor plate used to calibrate the analog image signal to a known digital code value as a function of x-ray exposure) is stored as part of the software configuration data file for each storage phosphor reader.

Finally, the laser beam scanning parameters which vary as a function of plate size and/or pixel resolution are also stored in a table in the configuration file of the reader. This means that the analog image gain (in this case the preamplifier 62 gain) is automatically adjusted to correct for the changing laser scanning exposure conditions. Since the gain is automatically adjusted by the system, the relative calibration of the system can be determined by just knowing the brightness of the reference storage phosphor and the brightness of the storage phosphor currently being scanned. Therefore, if a digital code value of 3300 (assuming a 12 bit code value range) represents a 20 mR x-ray exposure for a storage phosphor of brightness $B_{ref}$ then the code value for a 20 mR exposure for the currently scanned storage phosphor of brightness B would be $$CV_{20mR} = 3300 + 1000 * \text{Log}(B/B_{ref})$$

Figure 2:
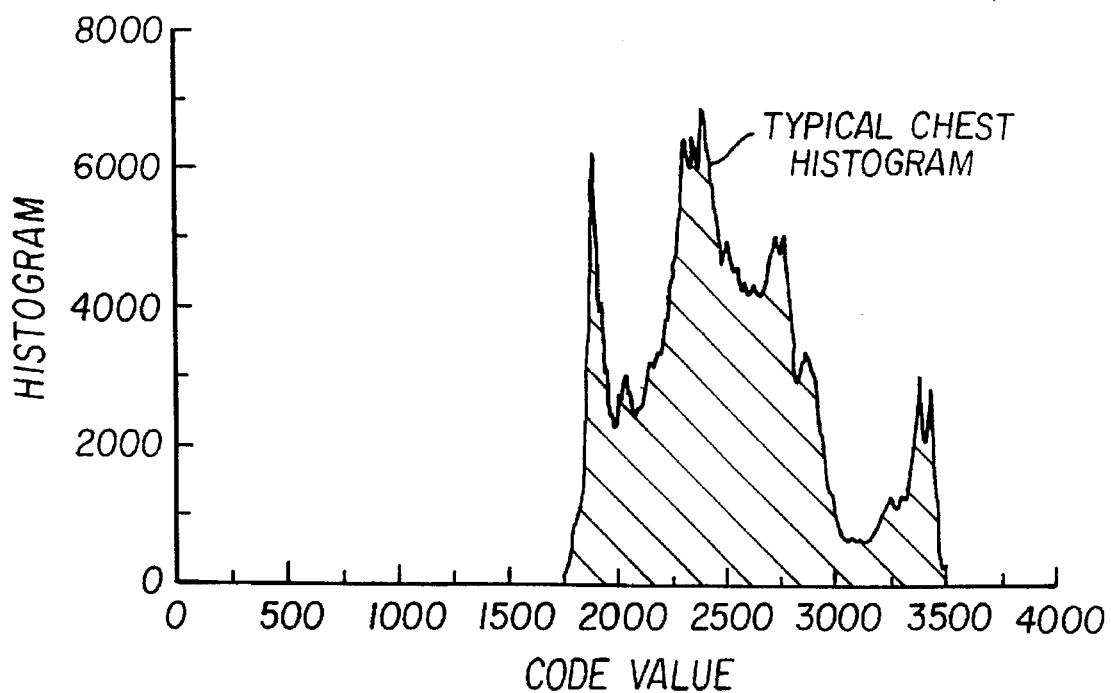
FIG. 2 is a histogram of a digital x-ray image read from an exposed storage phosphor.

The third key feature is the concept of an image histogram. During or after the scan of a storage phosphor image plate, a histogram as shown in FIG. 2 of the occurrences of each code value is automatically generated for the purpose of image processing/tone scaling the raw image data. The histogram can be viewed as the frequency of occurrence of each code value or as the cumulative or integrated frequency as a function of code value. This histogram data can then be interrogated to determine the maximum code value present in the image data, and that code value can be mapped to the incident x-ray exposure of the storage phosphor plate. Alternatively, the image dataset can be separately interrogated on a pixel by pixel basis to solely determine the maximum code value in the image.

Figure 3:
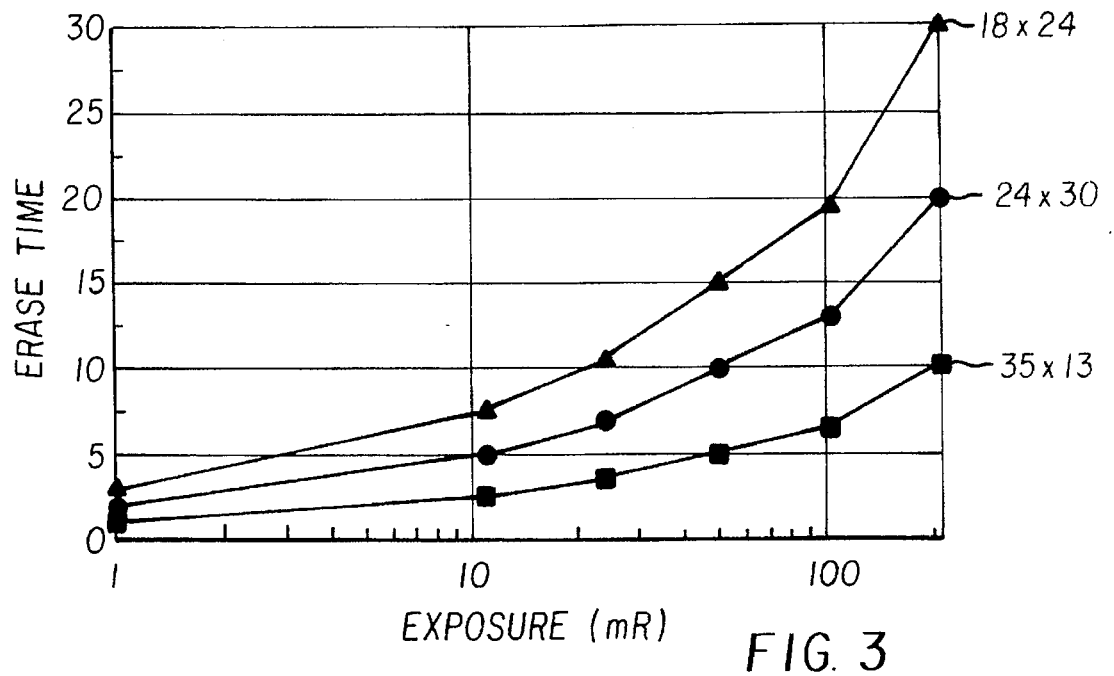
FIG. 3 is a graphical depiction of storage phosphor x-ray exposure vs. storage phosphor erase time.

As shown in FIG. 3, a function or a family of curves based on experimental erase data, then relates the amount of time necessary to erase a given x-ray exposure to an equivalent x-ray exposure level of less than 0.01 mR. The example shown in FIG. 3 shows that a 200 mR exposure to a given cassette size requires about 10 seconds to erase to less than 0.01 mR, while the 20 mR exposure requires about 3 seconds, a savings of 7 seconds. If we assume a nominal 72 seconds per plate cycle time in reader 100 (50 plates/hr.), a 7 second reduction in cycle time produces an approximate 4.4% increase in plate thruput (e.g., to 52 plates/hr.).

Figure 4:
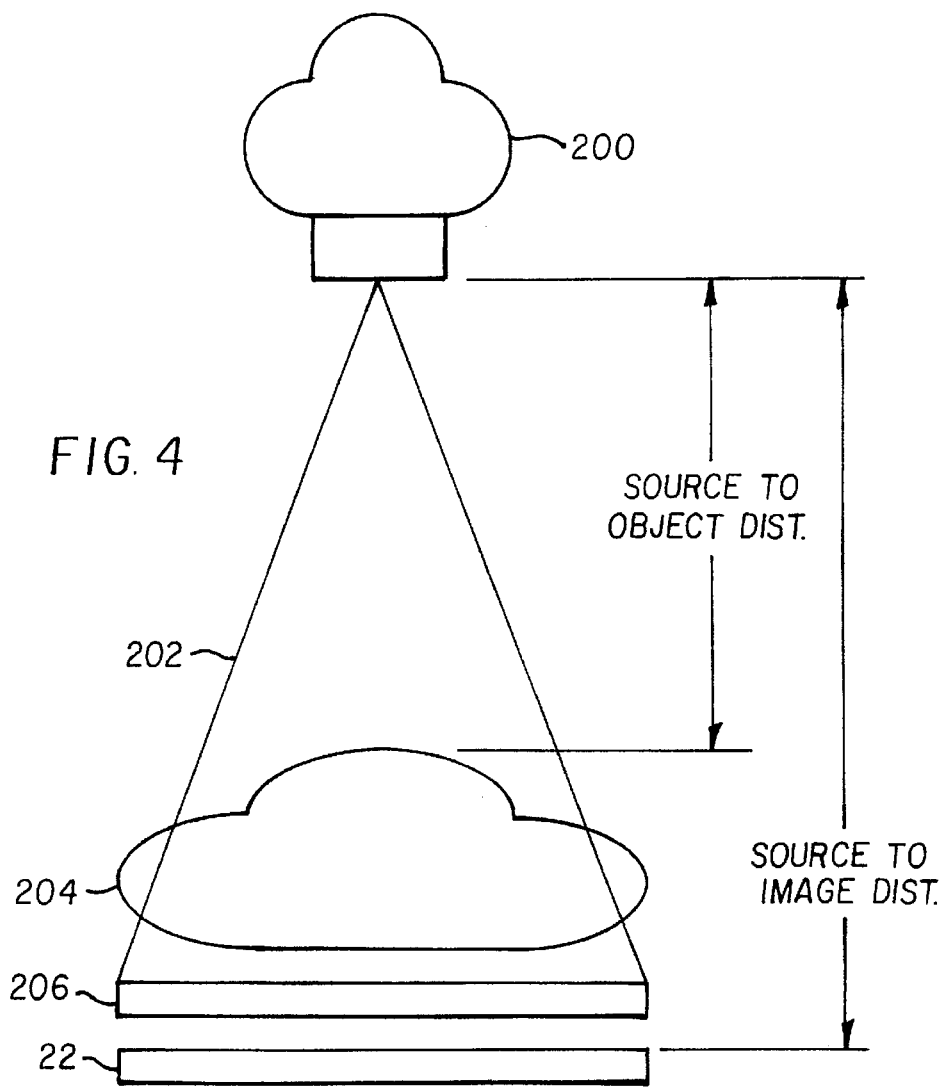
FIG. 4 is a diagrammatic view of an x-ray exposure of a body part.

Functionally, the controlled erase technique of the present invention operates as follows. As shown in FIG. 4, an x-ray exposure of a body part 204 is made where the body part is positioned between x-ray tube source 200 which projects x-ray beam 202 and grid 206 overlying storage phosphor cassette 22. This x-ray exposure imparts some level of exposure to the storage phosphor 24 in cassette 22. Typically, the incident x-ray photons are attenuated by the body part of interest and a lead grid. The worst case exposures to the cassette 22 are obviously in areas where the body part 204 and/or the collimating blades (not shown) of x-ray source 200 are absent. Grid 206 when used attenuates the incident x-ray exposure over the whole cassette surface.

Reader 100 is assumed to be calibrated by the technique disclosed in copending U.S. patent application No. 08/559,973, filed Nov. 17, 1995, inventor Rogers. As shown in FIG. 5, the cassette/plate size and speed have been read by read code reader from cassette bar code 300 during the loading of plate 24 into reader 100. The scan speed of galvo 14 and the gain of preamplifiers 62 are determined by the cassette size information. As plate 24 is scanned the signal from the PMTs 8/1–8/5 is summed and digitized by circuits 68,70. The digitized image data is processed by histogram or data analyzer 311 to determine the maximum code value digitized during scan. This code value is mapped through a lookup table 312 which converts the code value into the proper erase time.

When the storage phosphor scan is complete, erase lamp assembly 310 are turned on simultaneously with stage 34 returning home (i.e., the erase lamps are allowed to warm up). When the stage is nearly home, a switch (not shown) is actuated to enable the erase lamp timer control 314 which clocks the time determined by the appropriate lookup table value. The lookup table is preferably quantized in a selected number (e.g., 10) of discrete levels. The maximum erase time is defined by the time necessary to erase a 200 mR exposure to plate 24 while the minimum is set by bulb warm-up characteristics and software/hardware machine control overhead. (It will be appreciated that the maximum is implemented at about the 125 mR max level as supported by the analog to digital converter). The erase times between max and min are determined from experiment.

There are separate lookup tables for individual cassette sizes as well as a multiplier (i.e., scale factor) unique for different phosphor composition storage phosphors. These data are determined from the cassette speed number read into reader 100 by bar code reader 302.

Although the invention has been described above with reference to preferred embodiments, it will be understood that modifications and variations can be made within the scope of the invention.

What is claimed is:

1. In a storage phosphor imaging system including a scanner for scanning a storage phosphor storing an x-ray image to produce an x-ray light image, a converter for converting the x-ray light image into a digital x-ray image signal having a range of code values, and a storage phosphor erase light assembly for erasing said storage phosphor of substantially all residual image, an apparatus for controlling said erase light assembly, said apparatus comprising;

a digital image processor for determining the maximum code value of a digital x-ray image signal which is produced from an x-ray image stored in a storage phosphor to be erased;

a controller for controlling the time of actuation of said erase light assembly as a function of said determined maximum code value; and wherein said digital image processor produces a histogram of the code values of said digital x-ray image signal and determines said maximum code value from said histogram.

2. The apparatus of claim 1 wherein said controller includes a lookup table of code value vs. time of actuation which maps the determined maximum code value to the time of actuation of said erase lamp assembly.

3. In a storage phosphor imaging system including a scanner for scanning a storage phosphor storing an x-ray image to produce an x-ray light image, a converter for converting the x-ray light image into a digital x-ray image signal having a range of code values, and a storage phosphor erase light assembly for erasing said storage phosphor of substantially all residual image, an apparatus for controlling said erase light assembly, said apparatus comprising;

a digital image processor for determining the maximum code value of a digital x-ray image signal which is produced from an x-ray image stored in a storage phosphor to be erased;

a controller for controlling the time of actuation of said erase light assembly as a function of said determined maximum code value;

wherein said digital image processor produces a histogram of the code values of said digital x-ray image signal and determines said maximum code value from said histogram; and wherein said controller includes a set of lookup tables, one for each size of storage phosphor read by said system, wherein each of said lookup tables is a table of code value vs. time of actuation, which maps the determined maximum code value to the time of actuation of said erase lamp assembly and further includes a multiplier or scale factor for each of a plurality of different storage phosphor compositions.

\* \* \* \* \*